United States Patent [19]

Teramachi

[11] 4,095,854
[45] Jun. 20, 1978

[54] BEARING ASSEMBLY FOR A SLIDING RECTILINEAR MOTION

[76] Inventor: Hiroshi Teramachi, 2-34-8, Higashi-tamagawa, Setagaya-ku, Tokyo, Japan

[21] Appl. No.: 735,167

[22] Filed: Oct. 26, 1976

[51] Int. Cl.² .............................................. F16C 17/00
[52] U.S. Cl. ................................... 308/6 C; 308/3.8; 312/341 R
[58] Field of Search .................. 308/3.6, 3.8, 6 C; 312/341 R, 343, 34, 346, 347, 349

[56] References Cited

U.S. PATENT DOCUMENTS

| 2,001,999 | 5/1935 | Bishop | 308/3.8 |
| 3,035,873 | 5/1962 | Fall | 308/3.8 |
| 3,950,040 | 4/1976 | Fall | 308/6 C |

*Primary Examiner*—Richard A. Bertsch
*Attorney, Agent, or Firm*—Arthur T. Fattibene

[57] ABSTRACT

A bearing assembly for facilitating relative sliding rectilinear motion between a first and second part which includes a rail body adapted to be connected to one part, and a ball retainer means adapted to be connected to the other part. The rail means has opposed longitudinal edge portions defining a track, and the retainer means comprises a pair of complementary members defining an endless raceway, and which raceway has an outer edge portion disposed contiguous to the track portion of the rail body wherein a cut out portion or window is provided. A series of ball bearings are confined within the endless raceway whereby the window exposes a portion of the ball bearings which are disposed in bearing relationship to the associated track portion of the rail, so as to minimize resistance therebetween.

3 Claims, 11 Drawing Figures

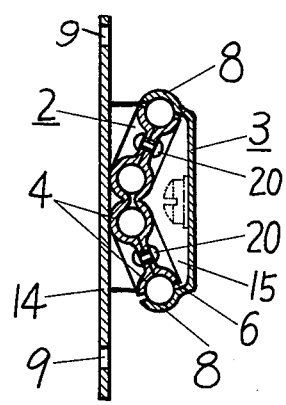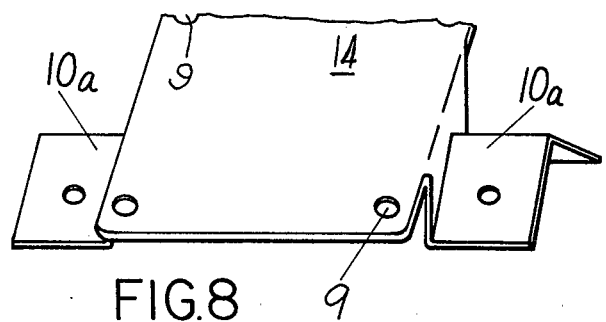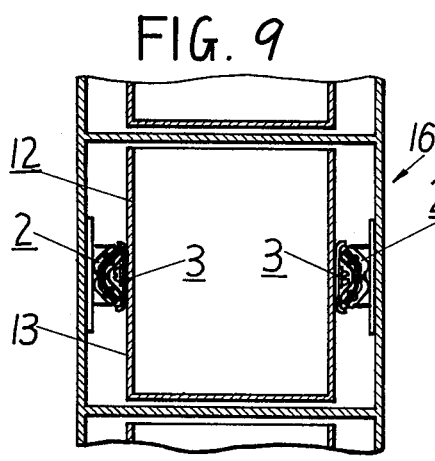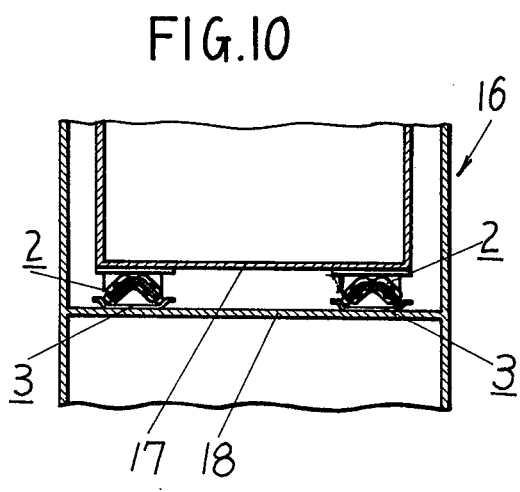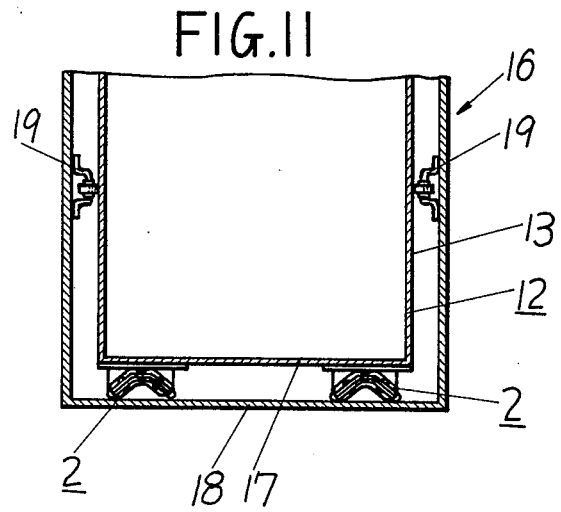

4,095,854

BEARING ASSEMBLY FOR A SLIDING RECTILINEAR MOTION

BACKGROUND OF THE INVENTION

The present invention relates in general to a bearing assembly for the sliding rectilinear motion, and, in particular, to the bearing assembly of the type widely used in a drawer of a filing cabinet, a bureau, a cabinet for adjustment of material, or the like.

In the type used in the drawer of the filing cabinet, etc., there is known a ball bearing assembly which comprises a ball retainer for holding only loaded balls and a track body on which loaded balls are able to slide. However, in this type of the ball bearing assembly when the ball retainer slides on the track body, loaded balls between the ball retainer and the track body cannot roll easily and the track body only slides on the surfaces of loaded balls. Consequently, frictional resistances between the ball retainer and loaded balls and between the track body and loaded balls become obviously great. It therefore is unavoidable that the surface of loaded ball in the ball retainer or the track body is remarkably worn and the ball bearing of this type accordingly cannot ensure a long life.

SUMMARY OF THE INVENTION

In accordance with the present invention, the bearing assembly for the sliding rectilinear motion comprises the ball retainer having one or more endless raceways. Each endless raceway is provided with the longitudinal window opened along the rectilinear outside portion thereof with balls being varried in each endless raceway and the part of each loaded ball being exposed from the window. The rail body has one or more than two track portions corresponding to the number of endless raceways. Each track portion contacts with a surface of each loaded ball of which the part is exposed through the window of the ball retainer, whereby each loaded ball is able to roll between the ball retainer and the rail body when the ball retainer slides relatively against the rail body.

OBJECTS

Accordingly, it is an object of the present invention to provide the bearing assembly capable of sliding very smoothly even if it bears a heavy load.

It is another object of the present invention to provide the bearing assembly in which the frictional resistances between the ball retainer and the loaded balls, and between the track portion and the loaded balls are very small and which is durable.

It is a furthermore object of the present invention to provide a bearing assembly which can be inexpensively made due to forming the ball retainer from thin steel plates and which can be easily mounted due to bending of the ball retainer along the longitudinal center line and providing the ball retainer with a mounting bed.

BRIEF DESCRIPTION OF THE DRAWINGS

In the drawings:

FIG. 7 is a sectional view taken along C—C line of FIG. 5;

FIG. 8 is a perspective view of the mounting bed of FIG. 5;

FIG. 9 through 11 are partially sectional views of the drawer applied the bearing assembly of FIG. 5.

DESCRIPTION OF THE PREFERRED EMBODIMENTS

Figure 1:
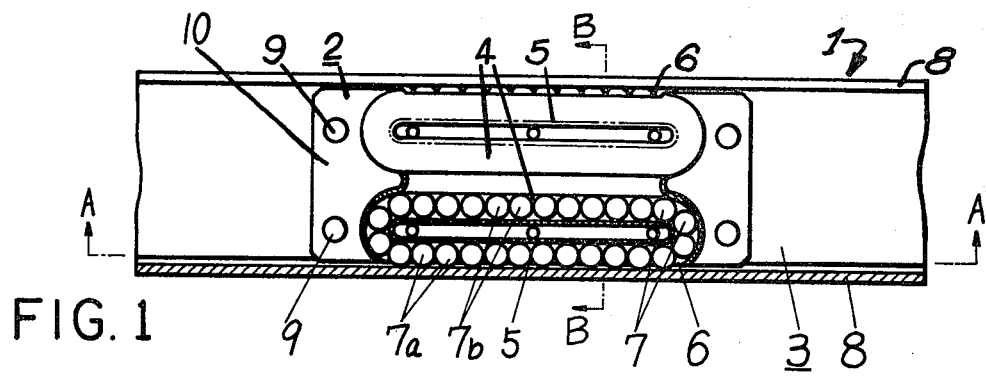
FIG. 1 is a partially sectional view of the bearing assembly according to one embodiment of the present invention.
Figure 2:
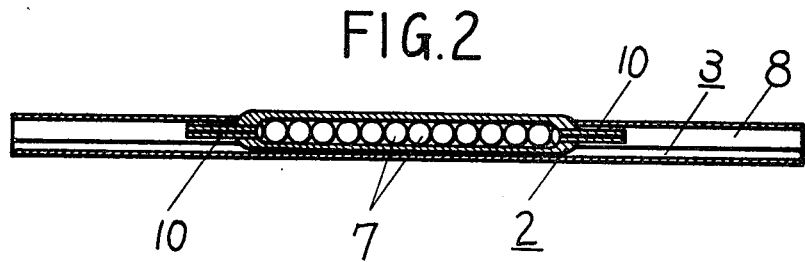
FIG. 2 is a sectional view taken along A—A line of FIG. 1.
Figure 3:
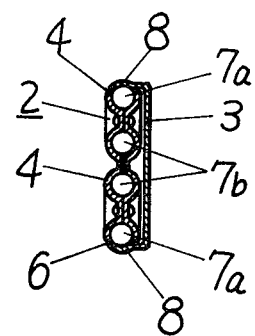
FIG. 3 is a sectional view taken along B—B line of FIG. 1.

Referring to FIGS. 1 through 3, there is shown a first embodiment of the bearing assembly according to the present invention. The bearing assembly 1 comprises the ball retainer 2 and the rail body 3. The ball retainer 2 is, in synmetry, provided with a pair of endless raceway members 4 and 4 which have at least one rectilinear and outside portions 5 and 5. respectively. Along each rectilinear and outside portion 5, each endless raceway 4 is provided with the longitudinal window 6. A large number of balls 7, 7, . . . are, slidably and in a line, filled up in each endless raceway 4, and each loaded ball 7a located in the position corresponding to the window 6 is partially exposed through the window 6. Each ball 7 can go through the endless raceway 4, and the part of each loaded ball 7a exposed in the window 6 is in contact with the track portion 8 of the rail body 3. The rail body 3 has an inverted C-shaped cross-section and is, in synmetry, provided with a pair of the track portions 8 and 8. the ball retainer 2 slidably fitts the rail body 3 in inclusion with loaded balls 7a, 7a, . . . Each loaded ball 7a therefore is able to roll between the ball retainer 2 and the track portion 8 of the rail body 3 when the ball retainer 2 slides relatively against the rail body 3. The ball retainer 2, at both end portions 10 and 10 thereof, is further provided with four bolt-holes 9, 9, 9 and 9 for the mounting, and the cross-width of each end portion 10 is narrower than the distance between the track portions 8 and 8 of the rail body 3.

Figure 4:
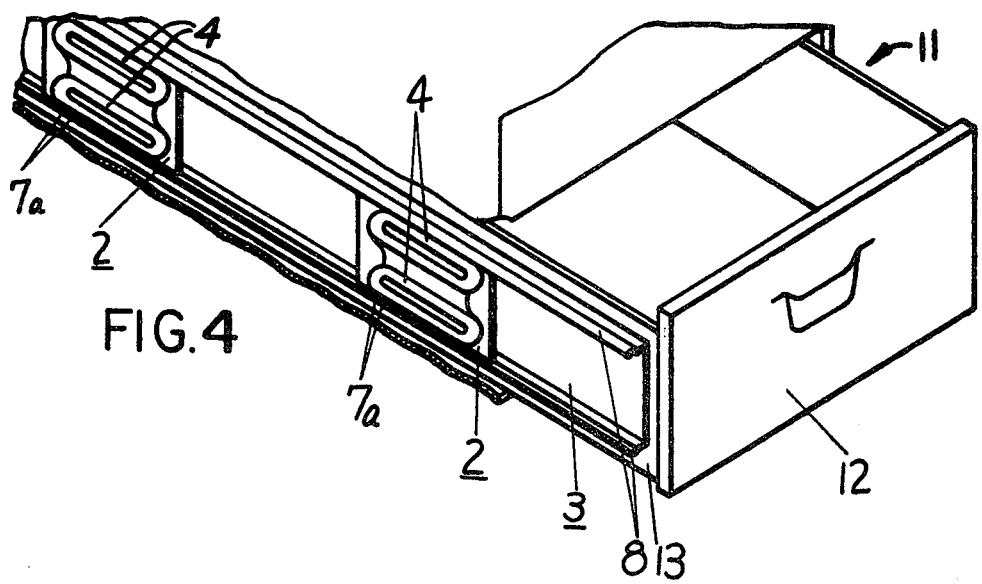
FIG. 4 is a partially cutaway view of the drawer applied the bearing assembly of FIG. 1.

In practical use of the bearing assembly 1 according to this embodiment, as shown in FIG. 4, there is shown a filing cabinet 11 in which the bearing assembly 1 is applied to a drawer 12 thereof. In this application, two rail body 3 and 3 are respectively mounted on the outsides 13 and 13 of the drawer 12 in the longitudinal direction, and at least two ball retainer 2 and 2, as fitted in each rail body 3, are mounted on the inside 14 of the filing cabinet 11. Of course, it will be naturally understood that conversely the ball retainers 2, 2, . . . may be mounted on both outsides 13 and 13 of the drawer 12 and the rail body 3 and 3 may be mounted on the inside of the filing cabinet 11.

Figure 5:
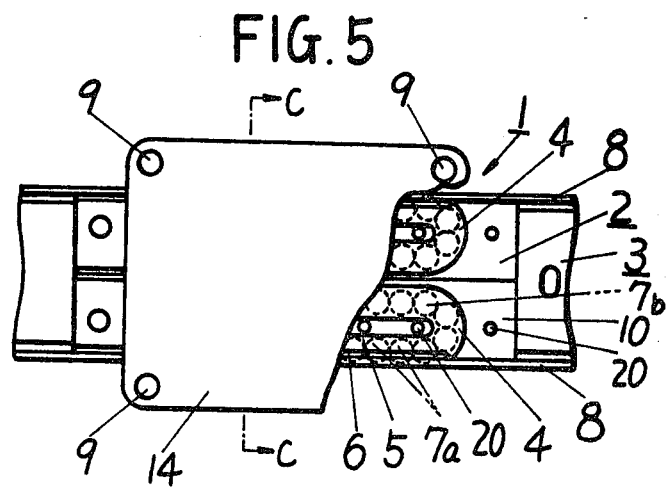
FIG. 5 is a partially cutaway plan view of the bearing assembly according to another embodiment of the present invention.
Figure 6:
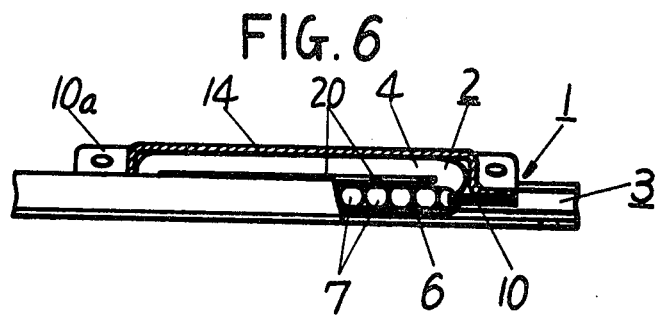
FIG. 6 is a partially cutaway side view of FIG. 5.

Referring to FIGS. 5 through 7, there is shown the second embodiment of the bearing assembly according to the present invention. The bearing assembly 1 according to this embodiment is similar to the bearing assembly according to the aforementioned embodiment, and comprises the ball retainer 2 and the rail body 3. The ball retainer 2 is bended along the longitudinal center line thereof and is provided with a mounting bed 14 on the convex surface thereof so as to be parallel to the plane surrounded by the conceptional lines connecting the centers of loaded ball 7a, 7a, . . . The mounting bed 14, as shown in FIG. 8, is provided with right and left end portions 10a and 10a, and each end portion 10a is the same cross-width as each end portion 10 of the ball retainer 2. End portions 10a and 10a are respectively covered and fixed on the end portions 10 and 10 of the ball retainer 2, combining the ball retainer 2 with the mounting bed 14.

In this embodiment, when the ball retainer 2 fits to the rail body 3, a space 15 is formed between the ball retainer 2 and the rail body 3 which has a triangular shaped sides. Bolt holes extended along the longitudinal center of the rail body 3 and bolt-heads passed through the bolt-holes. Thus the bolt heads (shown in phantom in FIG. 7) do not hinder the sliding motion of the ball retainer 2 on the rail body 3. Accordingly, the loaded capacity of the rail body 3 slides very easily compared with a conventional bearing assembly, and the sliding motion of the drawer 12 which is applied the bearing assembly 1 becomes very smooth. This is because the loaded due to the drawer 12 is divided into the components in the vertical and horizontal directions, and both vertical components in the both sides of the drawer 12 are in the opposite directions each other, and the drawer 12 therefore is maintained on the center portion between both rail body 3 and 3 due to the both vertical components being in the opposite directions each other.

In practical use of the bearing assembly 1 according to the second embodiment, there are shown three drawer arrangements 12, 12 and 12 in FIGS. 9 through 11. In FIG. 9, a pair of bearing assembly are mounted between the both outsides portions 13 and 13 of the drawer 12 and the inside of a cabinet 16 respectively. In FIG. 10, a pair of bearing assembly are mounted between a bottom 17 of the drawer 12 and a partition 18 of the cabinet 16 respectively at the predetermined space. In FIG. 11, a pair of guides 19 and 19 are mounted between the both outsides 13 and 13 of the drawer 12 and the inside of the cabinet 16 respectively in place of the rail bodies 3 and 3 in FIG. 10.

In the aforementioned embodiments, the ball retainer 2 is generally formed from two thin steel plates. Each thin steel plate forms two cavities of the endless raceways 4 and 4 by way of a stamping press after being cutted to the predetermined size. These plates formed two cavities which are joined each other to form endless raceways 4 and 4 rivets 20, 20, . . . , spot welder, or the like. The ball retainer 2 formed in such a maner, finally, is treated with a surface hardening, such as a nitride-treatment in order to improve a wear resistance thereof. Consequently, it will be naturally understood that it is capable of manufacturing the ball retainer very easily and at a very low price, even if it has endless raceways.

What is claimed is:

1. A bearing assembly for facilitating relative sliding rectilinear motion between a first part and a second part comprising a rail body adapted to be fixedly connected to one of said parts, said rail body having opposed laterly disposed longitudinal edge portions defining spaced parallel track portions, a ball retainer means adapted to be fixedly connected to the other of said parts and adapted to be received between said track portions, said retainer means including a pair of fixedly connected complementary members to define there between an endless raceway, said complementary raceway members comprising similar stampings having opposed end portions disposed in face to face relationship in the assembled fixed position, whereby the width of the assembled end portions is less than the width of the spaced apart track portion of said rail body, said raceway members having an outer edge portion dispose contiguous to said spaced track portions of said rail body, and said outer edge portion of said endless raceway members contiguous to said track portions having a lateral cut out portion defining a window, and a series of ball bearings confined between said stamped members within said endless raceway whereby said window exposes a lateral portion of said ball bearings rolling in bearing relationship to the contiguous track portion during a sliding operation so as to minimize resistance therebetween, said track portions and raceway members being formed to complement the shape of said ball bearings disposed in rolling engagement therebetween.

2. A bearing assembly as defined in claim 1 wherein said raceway members define a pair of endless raceways, each of said raceways having an outer rectilinear portion thereof disposed contiguous to its respective track portion, and said outer rectilinear portion of said raceway members having a cut out portion to define a window so that the loaded balls are in rolling engagement with said track portion.

3. A bearing assembly for facilitating relative sliding rectilinear motion between a first part and a second part comprising a rail body adapted to be connected to one of said parts, said rail body having opposed longitudinal edge portions defining a track portion, a ball retainer means adapted to be connected to the other of said parts and adapted to be received between said track portion, said retainer means including a pair of complementary members, said raceway members defining a pair of endless raceways, each of said raceways having an outer rectilinear portion thereof dispose contiguous to its respective track portion, and said outer portion of said respective endless raceway contiguous to said track having a cut out portion defining a window, and a series of ball bearings confined within said respective endless raceway whereby said respective windows exposes a portion of said ball bearings in bearing relationship to said track portion during a sliding operation to minimize resistance therebetween, said track portion and raceway being formed to complement the shape of said ball bearings, whereby the loaded balls are in rolling engagement with said track portion and, said ball retainer means being bent along a transverse fold line, said transverse fold line being disposed between said pair of raceways, and a mounting plate connected to the convex side of said bent retainer means whereby said mounting plate is disposed parallel to a plane coincidental to the center of the ball bearings in rolling engagement with the respective track portions of said body.

* * * * *